United States Patent
Lherault et al.

(10) Patent No.: US 10,782,892 B1
(45) Date of Patent: Sep. 22, 2020

(54) RECLAIMING STORAGE SPACE IN A STORAGE SUBSYSTEM

(71) Applicant: Pure Storage, Inc., Mountain View, CA (US)

(72) Inventors: Frederic Lherault, Mountain View, CA (US); Neil Vachharajani, San Francisco, CA (US)

(73) Assignee: Pure Storage, Inc., Mountain View, CA (US)

( * ) Notice: Subject to any disclaimer, the term of this patent is extended or adjusted under 35 U.S.C. 154(b) by 75 days.

(21) Appl. No.: 15/420,198

(22) Filed: Jan. 31, 2017

Related U.S. Application Data

(63) Continuation of application No. 14/624,752, filed on Feb. 18, 2015, now Pat. No. 9,710,165.

(51) Int. Cl.
*G06F 3/06* (2006.01)
*G06F 12/02* (2006.01)
*G06F 9/455* (2018.01)

(52) U.S. Cl.
CPC .......... *G06F 3/0619* (2013.01); *G06F 3/0665* (2013.01); *G06F 3/0689* (2013.01); *G06F 9/45558* (2013.01); *G06F 12/0253* (2013.01); *G06F 2009/45583* (2013.01); *G06F 2212/702* (2013.01)

(58) Field of Classification Search
None
See application file for complete search history.

(56) References Cited

U.S. PATENT DOCUMENTS

| | | | |
|---|---|---|---|
| 5,208,813 A | 5/1993 | Stallmo |
| 5,403,639 A | 4/1995 | Belsan |
| 5,940,838 A | 8/1999 | Schmuck et al. |
| 6,263,350 B1 | 7/2001 | Wollrath et al. |
| 6,412,045 B1 | 6/2002 | DeKoning et al. |
| 6,718,448 B1 | 4/2004 | Ofer |
| 6,757,769 B1 | 6/2004 | Ofer |
| 6,799,283 B1 | 9/2004 | Masaaki et al. |
| 6,834,298 B1 | 12/2004 | Singer et al. |

(Continued)

FOREIGN PATENT DOCUMENTS

| | | |
|---|---|---|
| CN | 103370685 A | 10/2013 |
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.

(Continued)

*Primary Examiner* — Denise Tran

(57) ABSTRACT

Systems, methods, and computer readable storage mediums for discovering volumes which are good candidates for space reclamation. A storage subsystem identifies the file system storage capacity for a given volume from the file system metadata of the given volume. Then, the storage subsystem compares the file system capacity of the given volume to the allocated capacity on the storage subsystem. If the allocated capacity is greater than the file system capacity by a given threshold, the storage subsystem marks the given volume as a candidate for space reclamation and generates an alert to the user to reclaim the space of the given volume.

18 Claims, 11 Drawing Sheets

(56) References Cited

U.S. PATENT DOCUMENTS

| | | |
|---|---|---|
| 6,850,938 B1 | 2/2005 | Sadjadi |
| 6,915,434 B1 | 7/2005 | Kuroda |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,216,164 B1 | 5/2007 | Whitmore et al. |
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,086,652 B1 | 12/2011 | Bisson et al. |
| 8,117,464 B1 | 2/2012 | Kogelnik |
| 8,205,065 B2 | 6/2012 | Matze |
| 8,352,540 B2 | 1/2013 | Anglin et al. |
| 8,527,544 B1 | 9/2013 | Colgrove et al. |
| 8,560,747 B1 | 10/2013 | Tan et al. |
| 8,621,241 B1 | 12/2013 | Stephenson |
| 8,700,875 B1 | 4/2014 | Barron et al. |
| 8,751,463 B1 | 6/2014 | Chamness |
| 8,806,160 B2 | 8/2014 | Colgrove et al. |
| 8,874,850 B1 | 10/2014 | Goodson et al. |
| 8,959,305 B1 | 2/2015 | Lecrone et al. |
| 9,383,924 B1 | 7/2016 | Fullbright et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2004/0049572 A1 | 3/2004 | Yamamoto et al. |
| 2005/0066095 A1 | 3/2005 | Mullick et al. |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0067585 A1 | 3/2007 | Ueda et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266037 A1* | 11/2007 | Terry .................. G06F 3/0607 |
| 2007/0266179 A1 | 11/2007 | Chavan et al. |
| 2008/0059699 A1 | 3/2008 | Kubo et al. |
| 2008/0065852 A1 | 3/2008 | Moore et al. |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | La Frese et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2011/0072300 A1 | 3/2011 | Rousseau |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0023375 A1 | 1/2012 | Dutta et al. |
| 2012/0036309 A1 | 2/2012 | Dillow et al. |
| 2012/0117029 A1 | 5/2012 | Gold |
| 2012/0198175 A1 | 8/2012 | Atkisson |
| 2012/0330954 A1 | 12/2012 | Sivasubramanian et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068211 A1* | 3/2014 | Fiske .................. G06F 11/1456 |
| | | 711/162 |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1* | 7/2014 | Kuzmin .............. G06F 12/0246 |
| | | 711/103 |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2014/0365719 A1* | 12/2014 | Kuzmin .............. G06F 12/0246 |
| | | 711/103 |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.

* cited by examiner

RECLAIMING STORAGE SPACE IN A STORAGE SUBSYSTEM

CROSS-REFERENCE TO RELATED APPLICATION

This application is a continuation application of and claims priority from U.S. patent application Ser. No. 14/624,752, filed on Feb. 18, 2015.

TECHNICAL FIELD

Embodiments described herein relate to storage systems, and more particularly, to techniques for detecting conflicting storage capacity between a host and a storage system and characterizing the potential space reclamation.

BACKGROUND ART

As computer memory storage and data bandwidth increase, so does the amount and complexity of data that businesses daily manage. Large-scale distributed storage systems, such as data centers, typically run many business operations. A data center, which also may be referred to as a server room, is a centralized repository, either physical or virtual, for the storage, management, and dissemination of data pertaining to one or more businesses.

A file system may be defined as the part of an operating system which translates file-based accesses into logical block addresses corresponding to storage locations on one or more storage devices. A file system may also be defined as software which organizes sectors of one or more storage devices into datasets (e.g., files, volumes), directories, and/or folders. The term "file system" may also refer to the organized datasets, directories, or folders. Commonly used file systems include File Allocation Table (FAT), New Technology File System (NTFS), Network File System (NFS), Hierarchical File System (HFS), International Organization for Standardization (ISO) 9960, High-Performance File System (HPFS), Unix File System (UFS), Veritas File System (VxFS), Virtual Machine File System (VMFS), Third Extended Filesystem (Ext3), Fourth Extended Filesystem (Ext4) and others.

In data centers utilizing block-based storage arrays, the file system is typically managed by the host and not by the storage array. Accordingly, the storage array does not know when a file has been deleted or moved from a storage volume and therefore does not know when or if to release the space. This situation is especially detrimental in thinly-provisioned environments where that space could be immediately allocated to another device or application or just returned to the pool of available storage.

SUMMARY

Various embodiments of systems and methods for detecting capacity and identifying volumes containing space which can be reclaimed on a storage subsystem are contemplated.

In one embodiment, a storage subsystem may include one or more storage controllers and one or more storage devices. The storage subsystem may be coupled to one or more servers and/or other computing devices via one or more networks. The storage controller may receive read and write operations from one or more hosts and/or one or more clients. The storage controller may be configured to store a plurality of datasets (e.g., volumes, virtual machines) for the one or more hosts and/or one or more clients.

In one embodiment, a first file system resident on a server external to the storage subsystem may organize and provide access to a first dataset on the storage subsystem. The first dataset may have a first capacity from the perspective of the storage subsystem. Over time, one or more files may be deleted or moved from the first dataset. After the one or more files have been deleted from the first dataset, the first dataset may have a second capacity as perceived by the first file system, wherein the second capacity is less than the first capacity. In one embodiment, the first file system may not automatically notify the storage subsystem when files are deleted within the first dataset. The storage subsystem may be configured to detect the discrepancy between the first capacity and the second capacity of the first dataset. In response to detecting the discrepancy, the storage subsystem may generate an alert for a user, wherein the alert includes a recommendation that a space reclamation process targeting the first dataset be performed.

In one embodiment, a plurality of file systems may simultaneously utilize the storage subsystem to store a plurality of datasets. The storage subsystem may be configured to scan the plurality of datasets on a periodic basis to determine if any of the datasets have a storage subsystem capacity which exceeds the file system capacity. If the storage subsystem detects that a given dataset has a storage subsystem capacity which exceeds the file system capacity, the storage subsystem may mark the given dataset as a candidate for space reclamation. The storage subsystem may also communicate to the user that the given dataset is a candidate for space reclamation.

In one embodiment, the storage subsystem may generate an alert in response to detecting that a given dataset is a candidate for space reclamation. The storage subsystem may communicate the alert through one or more channels (e.g., email, simple network management protocol (SNMP) trap). In one embodiment, the storage subsystem may be configured to generate an alert when the reclaimable capacity for any dataset reaches a given threshold. In another embodiment, the storage subsystem may generate an alert when a given threshold of reclaimable capacity for the entire storage subsystem is reached.

The storage subsystem may also be configured to generate a report showing the datasets with the highest potential for capacity reclamation. In one embodiment, the storage subsystem may generate a list which displays datasets from the highest potential to lowest potential for reclamation, and the storage subsystem may display the list in a storage subsystem graphical user interface (GUI). In one embodiment, the storage subsystem GUI may include a graphical control element, which when selected by the user, initiates a script to reclaim space for one or more selected datasets. The storage subsystem may also be configured to determine the file system names of the plurality of datasets stored on the storage subsystem. The storage subsystem may display the file system name and/or the storage subsystem name of a given dataset in the storage subsystem GUI.

These and other embodiments will become apparent upon consideration of the following description and accompanying drawings.

Figure 1:
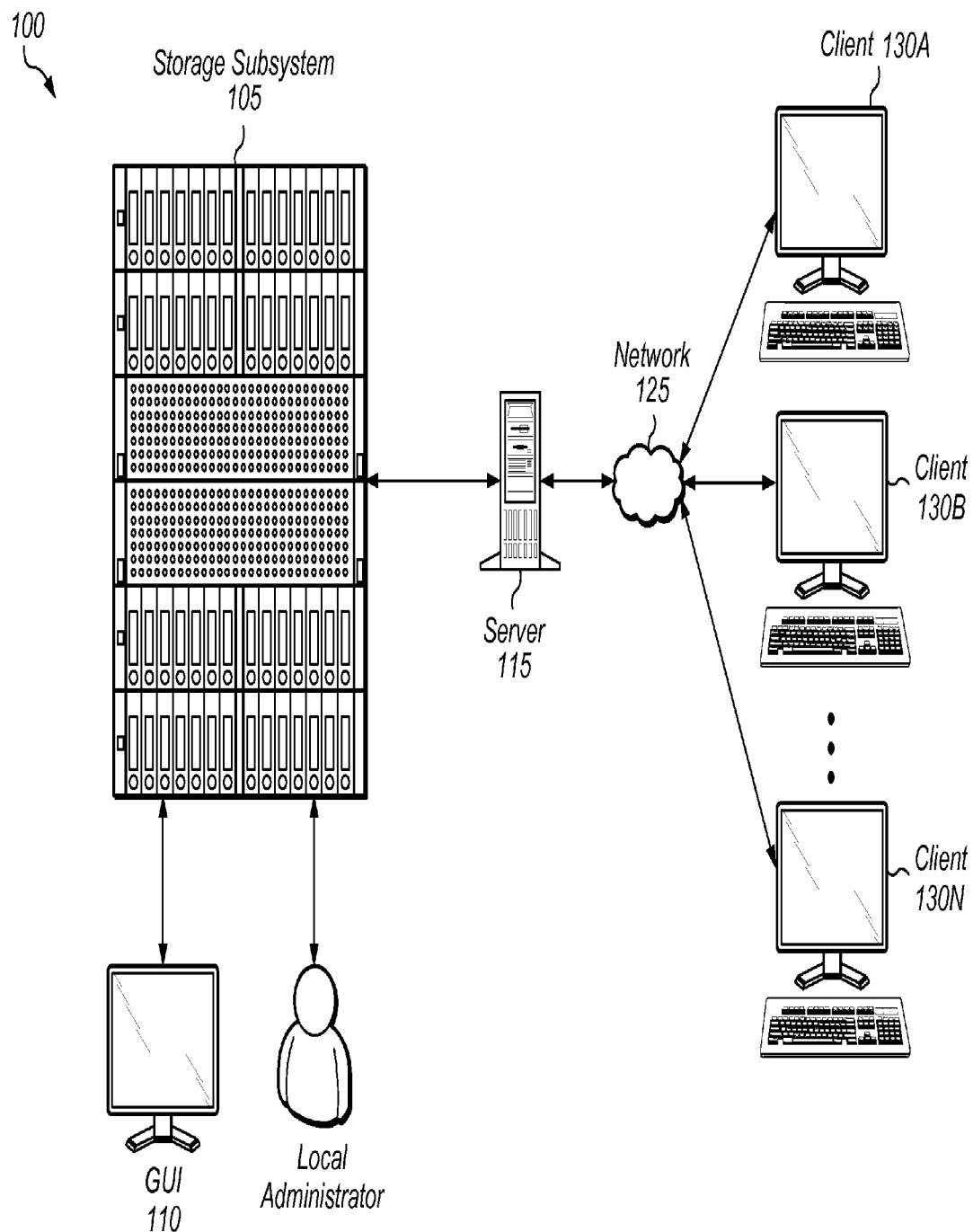
FIG. 1 is a generalized block diagram illustrating one embodiment of a storage system.

While the methods and mechanisms described herein are susceptible to various modifications and alternative forms, specific embodiments are shown by way of example in the drawings and are herein described in detail. It should be understood, however, that drawings and detailed description thereto are not intended to limit the methods and mechanisms to the particular form disclosed, but on the contrary, are intended to cover all modifications, equivalents and alternatives apparent to those skilled in the art once the disclosure is fully appreciated.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a storage controller . . . " Such a claim does not foreclose the system from including additional components (e.g., a network, a server, a display device).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a generalized block diagram of one embodiment of a storage system 100 is shown. Storage system 100 may include storage subsystem 105 and any number of other storage subsystems (not shown). Storage subsystem 105 may be any type of storage subsystem (e.g., storage array, storage server, storage shelf, storage device, Peripheral Component Interconnect Express WOO card, flash drive, SSD) depending on the embodiment. For example, in one embodiment, storage subsystem 105 may be a storage array. The storage array may utilize different types of storage device technology, depending on the embodiment. For example, in one embodiment, the storage array may utilize flash (or solid-state) storage devices and may be an all-flash storage array. In other embodiments, the storage array may utilize other types of storage device technology.

Storage subsystem 105 may be configured to generate a graphical user interface (GUI) 110 to allow a local administrator or other users to view the status of storage subsystem 105 and to manage the performance of storage subsystem 105. Storage subsystem 105 may be coupled to client computer systems 130A-N via server 115 and network 125. Although storage subsystem 105 is shown as being connected directly to server 115, it is noted that one or more components (e.g., switch, fibre channel switch) and/or one or more networks may be located between storage subsystem 105 and server 115, depending on the embodiment. Server 115 is representative of any number and type (e.g., file server, application server, block server, database server) of servers which may be coupled to storage subsystem 105. Server 115 may be configured to enable storage and retrieval of data from storage subsystem 105 by clients 130A-N.

Additionally, any number and type of virtual servers may be hosted by server 115, depending on the embodiment. Clients 130A-N are representative of any number of clients which may utilize storage subsystem 105 for storing and accessing data.

Network 125 may utilize a variety of techniques including wireless connection, direct local area network (LAN) connections, wide area network (WAN) connections such as the Internet, a router, storage area network (SAN), Ethernet, and others. Network 125 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 125. The network 125 may interface with a set of communications protocols used for the Internet such as the Transmission Control Protocol (TCP) and the Internet Protocol (IP), or TCP/IP.

Client computer systems 130A-N are representative of any number of stationary or mobile computers such as desktop personal computers (PCs), servers, server farms, workstations, laptops, handheld computers, terminals, servers, personal digital assistants (PDAs), smart phones, tablets, and so forth. Generally speaking, client computer systems 130A-N include one or more processors comprising one or more processor cores. Each processor core may include circuitry for executing instructions according to a predefined general-purpose instruction set. The processor cores may access cache memory subsystems for data and computer program instructions. The cache subsystems may be coupled to a memory hierarchy comprising random access memory (RAM) and a storage device.

It is noted that in alternative embodiments, the number and type of storage subsystems, client computers, networks, and servers is not limited to those shown in FIG. 1. At various times one or more clients may operate offline. In addition, during operation, individual client computer connection types may change as users connect, disconnect, and reconnect to system 100. Furthermore, the systems and methods described herein may be applied to directly attached storage systems or network attached storage systems and may include a host operating system configured to perform one or more aspects of the described methods. Numerous such alternatives are possible and are contemplated.

In one embodiment, storage subsystem 105 may be configured to identify potential candidates for space reclamation among the datasets (e.g., volumes, virtual machines, files) stored on storage subsystem 105. Storage subsystem 105 may be configured to perform this function independently (i.e., without any input) from server 115 and any of clients 130A-N. For example, storage subsystem 105 may be configured to identify candidates for space reclamation while storage subsystem 105 is disconnected from server 115, network 125, clients 130A-N, and any other networks, servers, computing devices, etc.

In one embodiment, storage subsystem 105 may maintain a list of datasets which are stored on storage subsystem 105. The list of datasets may include one or more volumes, virtual machines, files, or other logical groupings of data. Storage subsystem 105 may periodically scan the datasets from the list to determine good candidates for space reclamation. For example, in one embodiment, storage subsystem 105 may identify a first dataset from the list, and then storage subsystem 105 may locate file system metadata (e.g., file system header, table of contents) from the blocks assigned to the first dataset and stored in storage subsystem 105. Storage subsystem 105 may identify the file system type, file system name of the first dataset, and file system capacity of the first dataset from the file system metadata. Storage subsystem 105 may identify the number of physical storage blocks allocated to the first dataset and compare this to the size of the first dataset from the perspective of the host file system. In one embodiment, if storage subsystem 105 determines that the storage capacity allocated to the first dataset is greater than the file system capacity of the first dataset, storage subsystem 105 may alert a user that the first dataset has space that can be reclaimed. In another embodiment, if storage subsystem 105 determines that the first dataset has space available to be reclaimed, storage subsystem 105 may generate a request to the corresponding file system to reclaim the available blocks.

In various embodiments, storage subsystem 105 may be configured to discover the file system type of a given dataset without receiving this information from the host file system or server 115. In one embodiment, storage subsystem 105 may generate a first guess as to what the file system type is for the given dataset and then look for metadata (e.g., file system header, table of contents) that confirms the given dataset is the first file system type. If the first file system type does not match the metadata of the given dataset, then storage subsystem 105 may guess that the given dataset has a second file system type, wherein the second file system type is different from the first file system type. Storage subsystem 105 may be configured to continue this process until storage subsystem 105 is able to determine the file system type of the given dataset. Once storage subsystem 105 has determined the file system type of the given dataset, storage subsystem 105 may be configured to determine additional information (e.g., file system name, file system capacity) from the metadata associated with the given dataset.

In one embodiment, storage subsystem 105 may utilize a recursive process to discover the file system type of a given dataset. For example, if the file system type of a given dataset is a virtual machine file system (VMFS), then the given dataset may be composed of a plurality of virtual machines, each of which may be analyzed to discover if the corresponding virtual machine includes recoverable space. Generally speaking, storage subsystem 105 may be configured to analyze a first dataset within a second dataset to determine if the first dataset has recoverable space and is a good candidate for performing space reclamation, wherein the second dataset is part of a third dataset, wherein the third dataset is part of a fourth dataset, and so on. For example, in one embodiment, storage subsystem 105 may discover a file system inside of a virtual machine that is part of a VMFS, wherein the VMFS is part of a volume on storage subsystem 105. Storage subsystem 105 may be configured to generate specific alerts to target a single virtual machine disk (VMDK), of a plurality of VMDKs, for space reclamation within the VMFS. More generally, for a single given dataset, storage subsystem 105 may generate a plurality of alerts for reclaimable space corresponding to datasets within the single given dataset, wherein the plurality of alerts may be associated with a plurality of different types of file systems.

In another embodiment, storage subsystem 105 may discover an extended (ext3) file system inside a VMFS. Storage subsystem 105 may determine that the ext3 file system is using a first storage capacity on storage subsystem 105, and the VMDK inside VMFS may report a second storage capacity for the ext3 file system, wherein the second storage capacity is less than the first storage capacity. In one embodiment, storage subsystem 105 may discover the discrepancy between the first storage capacity and the second storage capacity by discovering that the number of non-zero blocks stored in the VMDK file exceeds the size according to the file system inside the virtual machine. In response to discovering the discrepancy, storage subsystem 105 may be configured to mark the ext3 file system as a candidate for space reclamation and/or generate a corresponding alert to the user.

Figure 2:
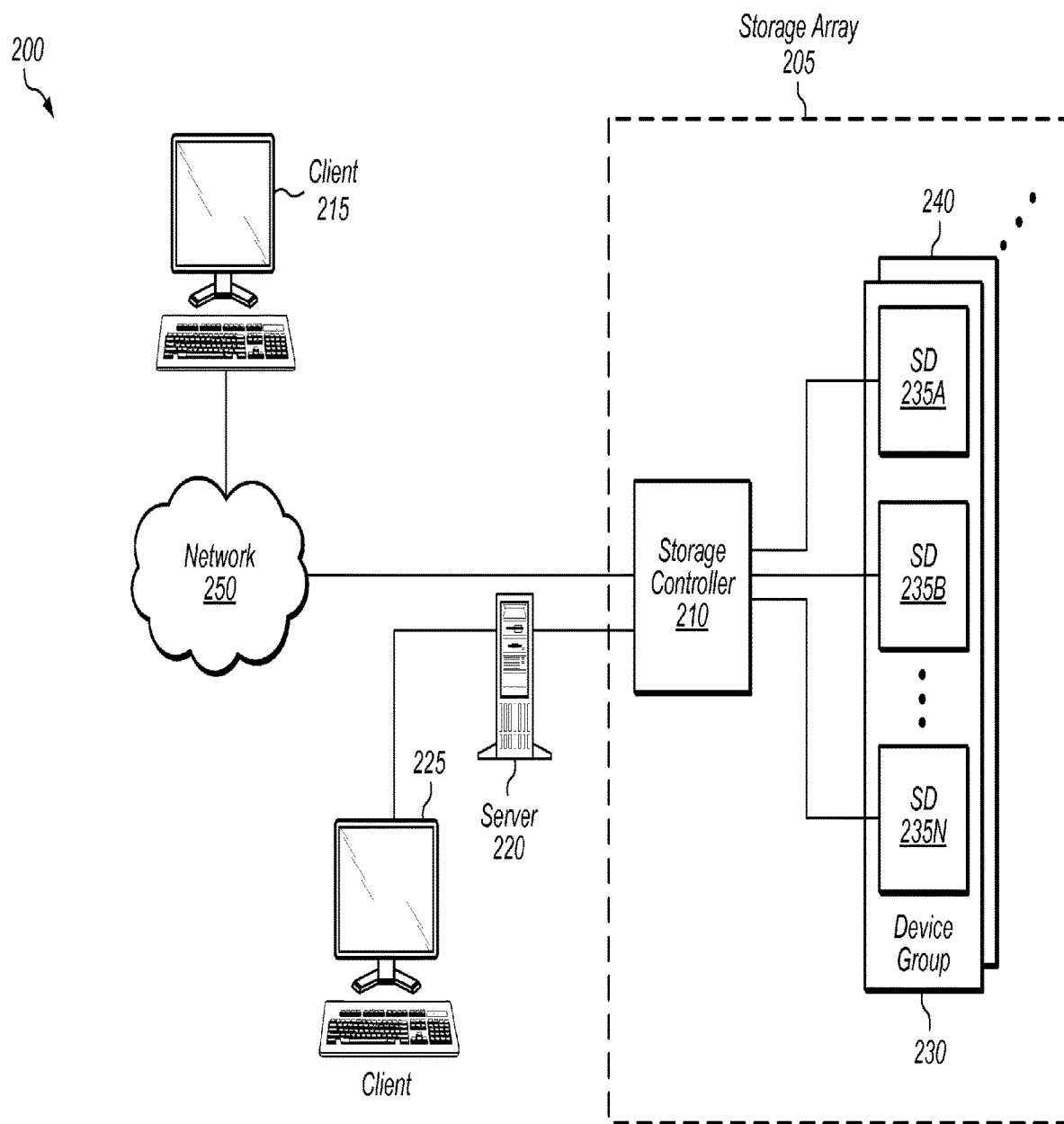
FIG. 2 is a block diagram of another embodiment of a storage system.

Turning now to FIG. 2, a block diagram of another embodiment of a storage system 200 is shown. Storage system 200 may include storage array 205, server 220, clients 215 and 225, and network 250. Storage array 205 may include storage controller 210 and storage device groups 230 and 240, which are representative of any number of storage device groups. As shown, storage device group 230 includes storage devices 235A-N, which are representative of any number and type of storage devices (e.g., solid-state drives (SSDs), PCIe cards, hard disk drives (HDDs), USB drives). It should be understood that while storage system 200 is shown as including one storage array, in other embodiments, storage system 200 may include a plurality of storage arrays. It is noted that storage array 205 may also be referred to as a storage subsystem. Although not shown in FIG. 2, it is noted that storage array 205 may include two or more storage controllers in other embodiments.

Storage controller 210 may include software and/or hardware configured to provide access to storage devices 235A-N. Although storage controller 210 is shown as being separate from storage device groups 230 and 240, in some embodiments, storage controller 210 may be located within one or each of storage device groups 230 and 240. Storage controller 210 may include or be coupled to a base operating system (OS), a volume manager, and additional control logic for implementing the various techniques disclosed herein.

Storage controller 210 may include and/or execute on any number of processors and may include and/or execute on a single host computing device or be spread across multiple host computing devices, depending on the embodiment. In some embodiments, storage controller 210 may generally include or execute on one or more file servers and/or block servers. Storage controller 210 may use any of various techniques for replicating data across devices 235A-N to prevent loss of data due to the failure of a device or the failure of storage locations within a device. Storage controller 210 may also utilize any of various deduplication and/or compression techniques for reducing the amount of data stored in devices 235A-N.

Storage array 205 may be configured to determine if any of a plurality of datasets stored on storage array 205 is a good candidate for space reclamation. In one embodiment, storage array 205 may also be configured to determine if a portion or subset of any dataset is a good candidate for space reclamation. In one embodiment, the plurality of datasets stored on storage array 205 may correspond to a plurality of different file systems. Storage array 205 may be configured to manage separate datasets differently based on the type of file system to which the dataset corresponds.

For example, a first file system may automatically perform space reclamation for the datasets it manages. Therefore, when storage array 205 is searching for a good dataset candidate for performing space reclamation, storage array 205 may skip any datasets managed by the first file system. This may be advantageous when storage array 205 has a limited time window for identifying good candidates for performing space reclamation.

Storage array 205 may identify a subset of datasets, of the plurality of datasets, as potential candidates for space reclamation, wherein the subset of datasets is chosen based at least in part on the types of file systems to which they belong. Storage array 205 may then read the file system metadata for this subset of datasets and determine the amount of space which can be reclaimed for these datasets. In one embodiment, if any dataset from the subset has a threshold amount of reclaimable space, then storage array 205 may mark the dataset as a candidate for space reclamation and generate an alert. In response to receiving the alert, the user may launch a script targeting only the marked dataset for space reclamation. In one embodiment, the alert may be configured to modify the script by specifying which dataset to target for space reclamation.

Figure 3:
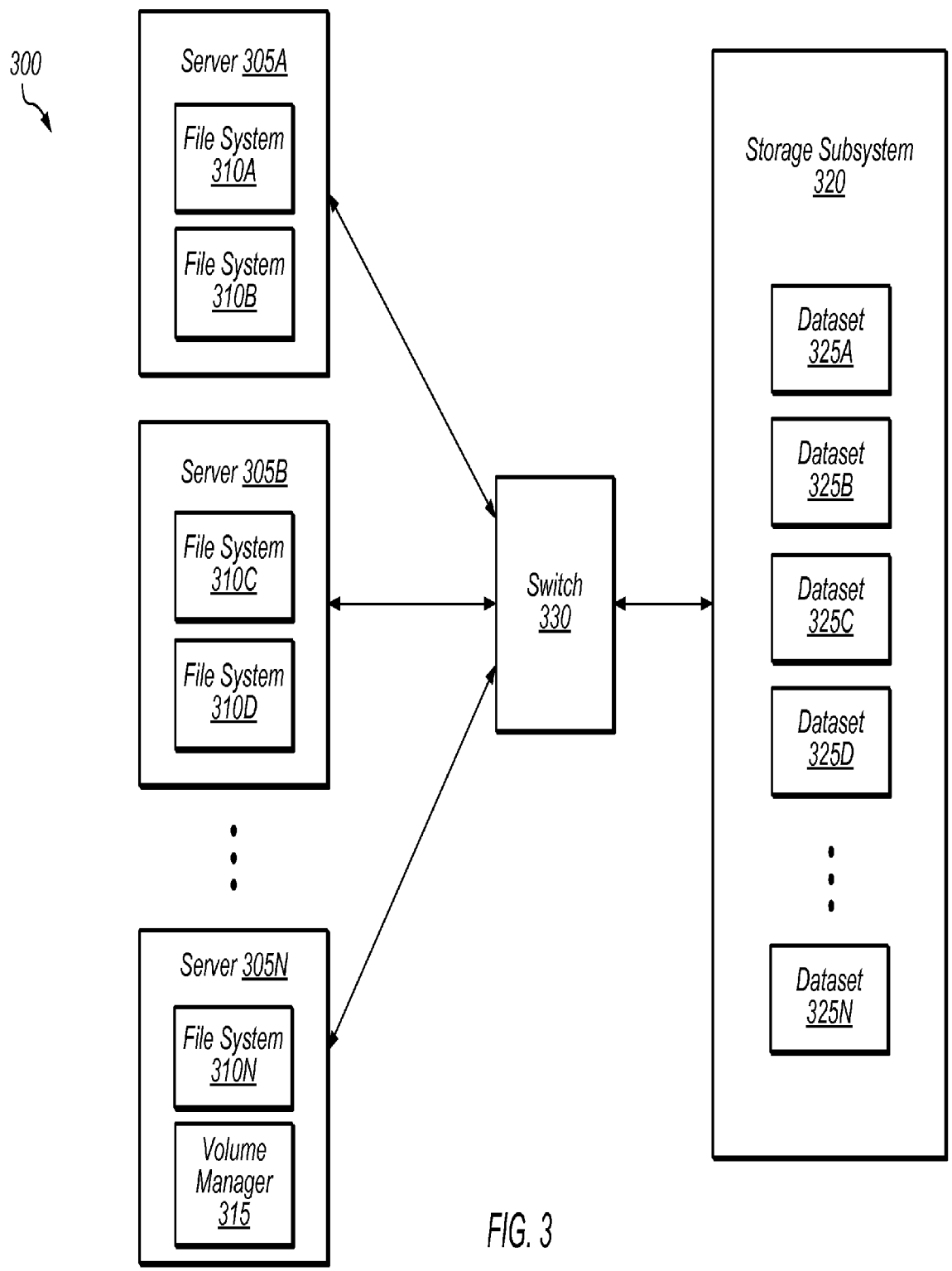
FIG. 3 illustrates a logical block diagram of one embodiment of a storage system.

Referring now to FIG. 3, a logical block diagram of one embodiment of a storage system 300 is shown. Storage system 300 may include at least servers 305A-N, switch 330, and storage subsystem 320. Servers 305A-N are representative of any number and type of servers. In one embodiment, one or more of servers 305A-N may be virtual servers. Server 305A may include at least file systems 310A-B, server 305B may include at least file systems 310C-D, and server 305N may include at least file system 310N and volume manager 315. File systems 310A-N are representative of any number and type (e.g., NTFS, VMFS, Ext3, Ext4) of file systems which may be utilized on servers 305A-N. Servers 305A-N may be configured to utilize storage subsystem 320 for storing data associated with the operating systems, file systems, volume managers, hypervisors, and other applications and programs executing on servers 305A-N.

Storage subsystem 320 may store datasets 325A-N, which are representative of any number and type of datasets (e.g., volumes, virtual machines, files). For each dataset of datasets 325A-N, storage subsystem 320 may be configured to identify the file system type of the dataset as well as other characteristics such as dataset name (from the file system perspective) and file system capacity of the dataset. Storage subsystem 320 may be configured to identify dataset candidates for space reclamation based on detecting a discrepancy between the file system capacity of a given dataset and the storage subsystem capacity of the given dataset. In various embodiments, storage subsystem 320 may be configured to generate alerts, notify users, and/or launch space reclamation tasks in response to detecting one or more conditions associated with datasets 325A-N.

Figure 4:
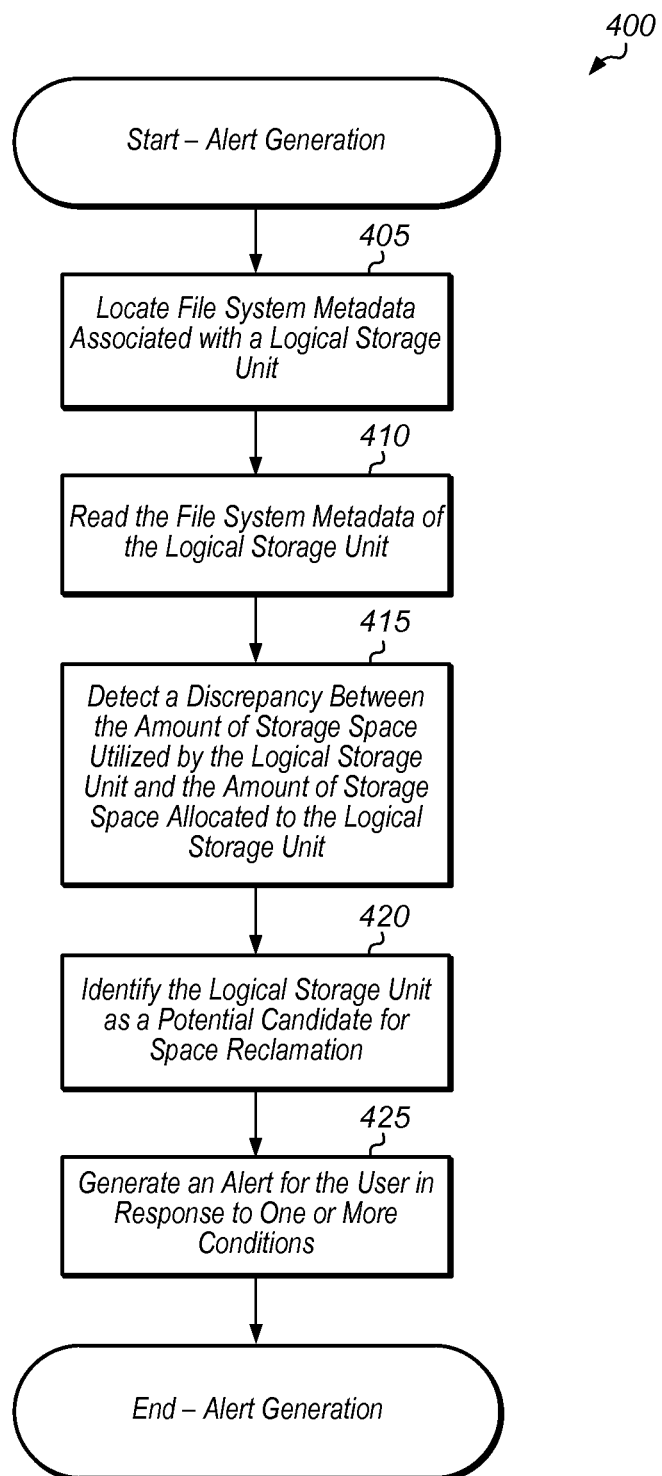
FIG. 4 is a generalized flow diagram illustrating one embodiment of a method for alert generation.

Referring now to FIG. 4, one embodiment of a method 400 for performing alert generation is shown. The components embodied in systems 100, 200, or 300 described above (e.g., storage controller 210) may generally operate in accordance with method 400. In addition, the steps in this embodiment are shown in sequential order. However, some steps may occur in a different order than shown, some steps may be performed concurrently, some steps may be combined with other steps, and some steps may be absent in another embodiment.

A storage controller, of a storage subsystem (e.g., storage array), may locate metadata of a file system associated with a logical storage unit (block 405). The logical storage unit may be a dataset, volume, virtual machine, file, or other logical grouping of data. In one embodiment, the storage controller may not know the file system type of the logical storage unit prior to locating the metadata. Next, the storage controller may read the file system metadata of the logical storage unit (block 410). In various embodiments, the storage controller may determine the file system type, the file system name of the logical storage unit, the amount of storage space utilized by the file system for the logical storage unit, and one or more other factors associated with the logical storage unit by reading the file system metadata.

Next, the storage controller may detect a discrepancy between the amount of storage space utilized by the logical storage unit and the amount of storage space allocated to the logical storage unit (block 415). The storage controller may detect the discrepancy independently of the host (or server) and file system associated with the logical storage unit. For example, if the storage subsystem is disconnected from the host, the storage controller would still be able to detect the discrepancy. In one embodiment, the storage controller may detect the discrepancy by comparing the amount of storage space utilized by the logical storage unit and the amount of storage space allocated to the logical storage unit and detecting that the amount of storage space utilized by the logical storage unit is less than the amount of storage space allocated to the logical storage unit.

In response to detecting the discrepancy, the storage controller may identify the first logical storage unit as a potential candidate for space reclamation (block 420). Next, the storage controller may generate an alert for users of the storage subsystem in response to one or more conditions (block 425). The alert may be communicated through one or more of various alerting channels (e.g., emails, SNMP traps). Depending on the embodiment, the one or more conditions may include the storage controller detecting that a given percentage threshold (e.g., 5%, 10%) of the logical storage unit's allocated storage space has been reached, a given storage space threshold (e.g., 100 GB) has been reached, a given percentage threshold or storage space threshold of total storage subsystem capacity has been reached, and/or one or more other conditions. After block 425, method 400 may end. It is noted that method 400 may be performed a plurality of times for a plurality of logical storage units (e.g., volumes, virtual machines, files).

Figure 5:
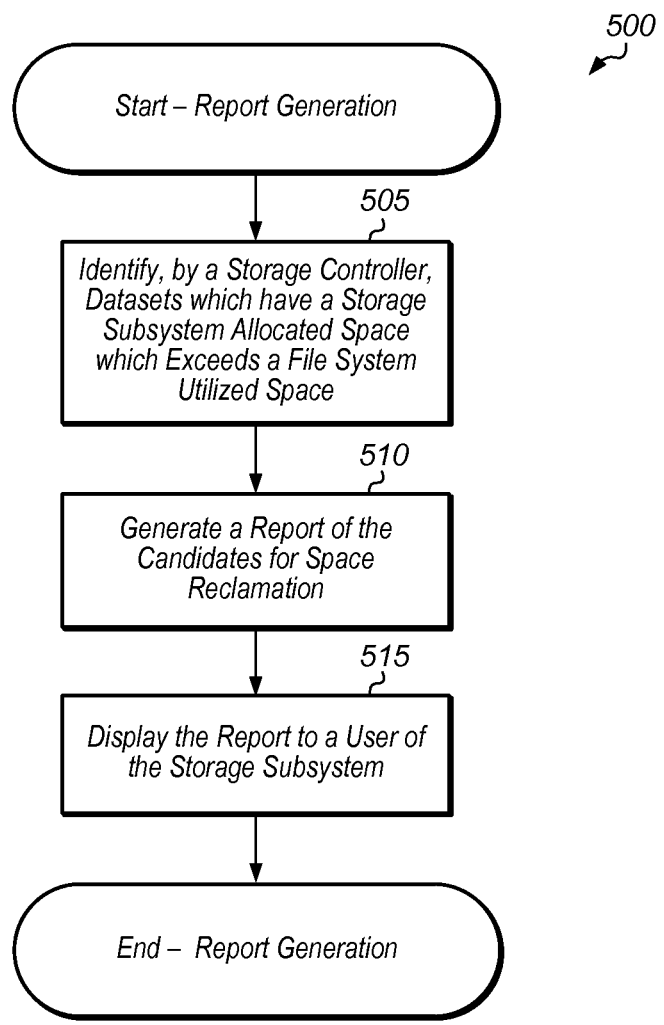
FIG. 5 is a generalized flow diagram illustrating one embodiment of a method for generating a report of the best dataset candidates for performing space reclamation.

Referring now to FIG. 5, one embodiment of a method 500 for generating a report of the best dataset candidates for performing space reclamation is shown. The components embodied in systems 100, 200, or 300 described above (e.g., storage controller 210) may generally operate in accordance with method 500. In addition, the steps in this embodiment are shown in sequential order. However, some steps may occur in a different order than shown, some steps may be performed concurrently, some steps may be combined with other steps, and some steps may be absent in another embodiment.

The storage controller of a storage subsystem (e.g., storage array) may be configured to identify which datasets of a plurality of datasets have a storage subsystem capacity which exceeds the file system capacity (block 505). Next, the storage controller may generate a report of the best candidates for space reclamation (block 510). In one embodiment, the report may list the best candidates with the most space to reclaim at the top of the list. In some embodiments, the report may only list candidates with at least a threshold amount or a threshold percentage (as a total of the corresponding dataset's allocated capacity) of space to be reclaimed.

Next, the storage controller may display the report to a user or administrator of the storage subsystem (block 515). In one embodiment, the report may be displayed in a storage subsystem status GUI. In some embodiments, the storage subsystem status GUI may also include graphical control elements to allow a user to launch a script to reclaim space on one or more of the best dataset candidates. After block 515, method 500 may end. Executing method 500 may be advantageous for the storage subsystem by allowing for a more efficient space reclamation process by targeting the best candidates for space reclamation rather than trying to reclaim space from a large number of datasets, some of which may have little or no space to reclaim.

Figure 6:
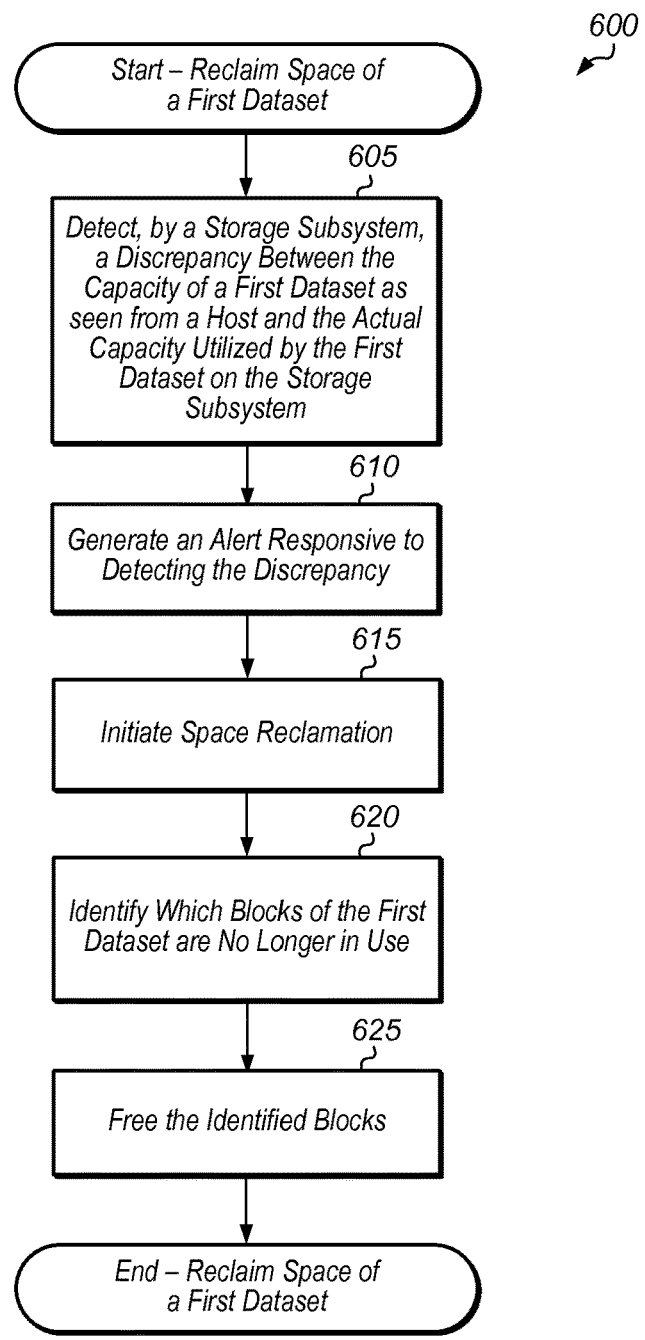
FIG. 6 is a generalized flow diagram illustrating one embodiment of a method for reclaiming space of a first dataset.

Referring now to FIG. 6, one embodiment of a method 600 for reclaiming space of a first dataset is shown. The components embodied in systems 100, 200, or 300 described above (e.g., storage controller 210) may generally operate in accordance with method 600. In addition, the steps in this embodiment are shown in sequential order. However, some steps may occur in a different order than shown, some steps may be performed concurrently, some steps may be combined with other steps, and some steps may be absent in another embodiment.

A storage subsystem (e.g., storage array) may detect a discrepancy between the capacity of a first dataset as seen from a host and the actual capacity utilized by the first dataset on the storage subsystem (block 605). The storage subsystem may generate an alert responsive to detecting the capacity discrepancy (block 610). The alert may be communicated through one or more of various alerting channels (e.g., emails, SNMP traps).

In response to the alert being generated, a space reclamation script may be launched (block 615). In one embodiment, a user may launch the space reclamation alert in response to receiving the alert. Alternatively, in another embodiment, the space reclamation script may be launched automatically in response to the alert. The space reclamation script may determine which blocks of the first dataset are no longer in use (block 620). In one embodiment, the script may obtain the identity of the blocks from the file system associated with the first dataset. Then, the space reclamation script may issue commands to the storage subsystem to free the identified blocks (block 625). In one embodiment, the script may issue small computer system interface (SCSI) UNMAP commands to the storage subsystem. In one embodiment, freeing the identified blocks may comprise removing references from the first dataset to the identified blocks. These blocks may be freed at a later point in time as part of garbage collection operations if the blocks are not referenced by any other datasets. After block 625, method 600 may end.

Figure 7:
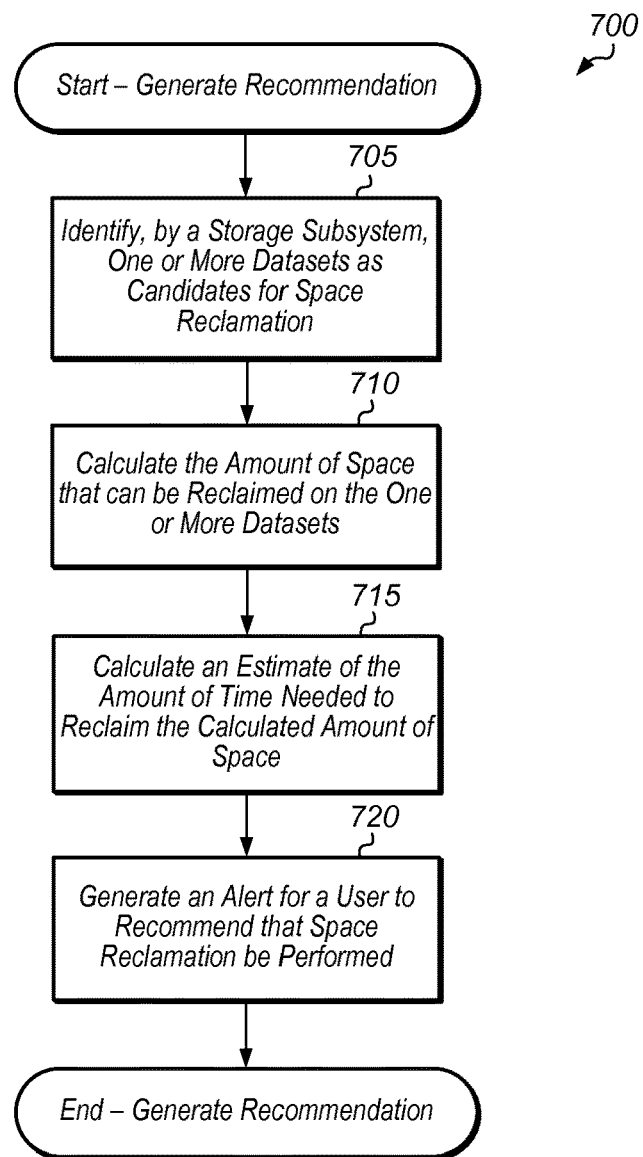
FIG. 7 is a generalized flow diagram illustrating one embodiment of a method for generating a recommendation.

Referring now to FIG. 7, one embodiment of a method 700 for generating a recommendation is shown. The components embodied in systems 100, 200, or 300 described above (e.g., storage controller 210) may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

A storage subsystem may identify one or more datasets as candidates for space reclamation (block 705). The storage subsystem may calculate the amount of space that can be reclaimed for the one or more datasets (block 710). In one embodiment, the amount of space that can be reclaimed may be equal to the difference between the file system utilized capacity of the one or more datasets and the storage subsystem allocated capacity of the one or more datasets.

The storage subsystem may also calculate an estimate of the amount of time needed for reclaiming the calculated amount of space (block 715). The storage subsystem may calculate the estimate based on the amount of space to reclaim, the type of file system associated with each dataset of the one or more datasets, and/or one or more other factors. Then, the storage subsystem may generate an alert for a user to recommend that space reclamation be performed (block 720). In one embodiment, the alert may include an indication of the amount of space that can be reclaimed along with an indication of the estimate of the amount of time needed for reclaiming this amount of space. In some embodiments, the storage subsystem may generate a graphical control element for the storage subsystem GUI, and the graphical control element may allow the user to initiate space reclamation for the one or more datasets identified in block 705. After block 720, method 700 may end.

Figure 8:
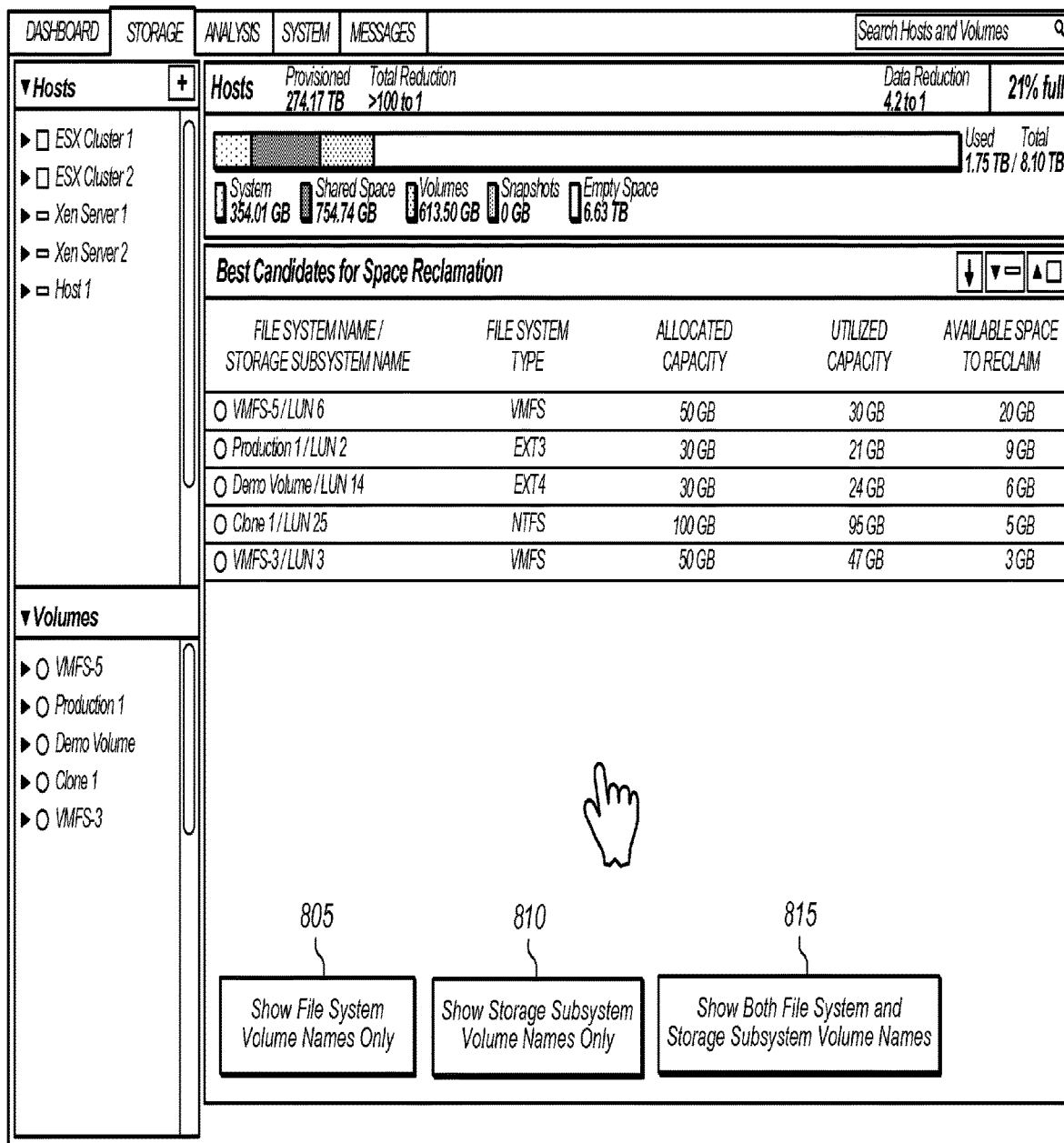
FIG. 8 illustrates one embodiment of a storage subsystem status GUI.

Turning now to FIG. 8, one embodiment of a storage subsystem status GUI 800 is shown. The storage subsystem GUI may be generated by a storage subsystem to allow a user to view the status of the storage subsystem and the various volumes and other datasets stored therein. Each volume stored by the storage subsystem may have both a file system name and a storage subsystem name, wherein the file system name is different from the storage subsystem name. Five different volumes are shown in GUI 800, with each volume showing the file system name followed by the storage subsystem name. These five volumes include: VMFS-5 (file system name) or LUN 6 (storage subsystem name), Production 1 (file system name) or LUN 2 (storage subsystem name), Demo Volume (file system name) or LUN 14 (storage subsystem name), Clone 1 (file system name) or LUN 25 (storage subsystem name), and VMFS-3 (file system name) or LUN 3 (storage subsystem name).

The use of different names for the same volume can potentially cause confusion for users of the storage subsystem. Accordingly, the storage subsystem GUI may include graphical control elements 805, 810, and 815 to allow the user to choose which names of volumes are shown. The user may select graphic control element 805 to show only the file system names of the volumes, the user may select graphic control element 810 to show only the storage subsystem names of the volumes, or the user may select graphic control element 815 to show both the file system names and the storage subsystem names of the volumes. It is noted that GUI 800 is intended to represent a storage subsystem status GUI in accordance with one embodiment. In other embodiments, the storage subsystem status GUI may be organized differently and/or may include additional information.

In one embodiment, when a server coupled to the storage subsystem uses a logical volume manager, the storage subsystem may be configured to group together volumes belonging to the same volume group in GUI 800. By grouping together volumes belonging to the same volume group in GUI 800, users may be able to manage these volumes as a single entity without having to declare this entity at the storage level.

Figure 9:
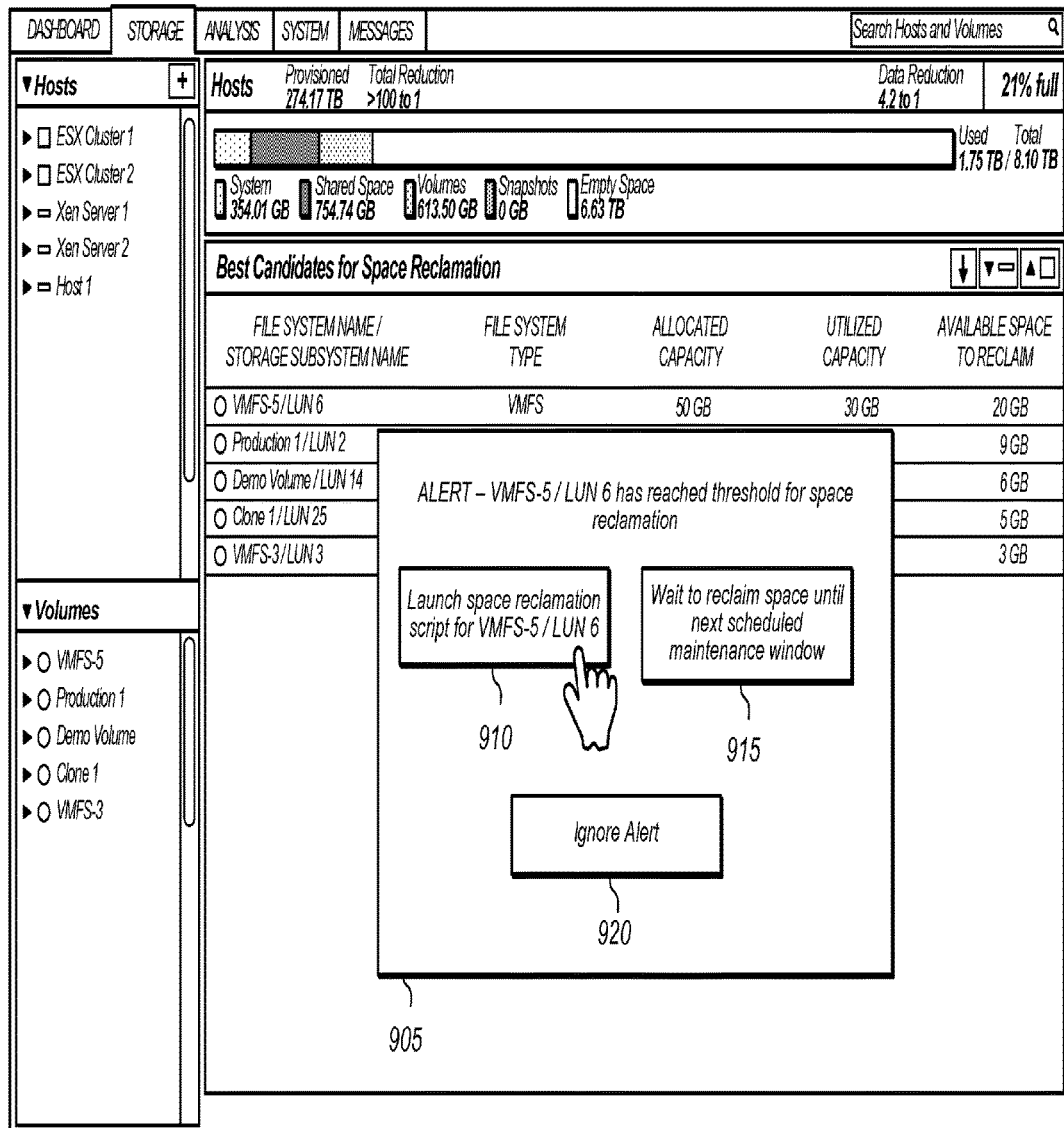
FIG. 9 illustrates another embodiment of a storage subsystem status GUI.

Referring now to FIG. 9, another embodiment of a storage subsystem status GUI 900 is shown. GUI 900 shows the best candidates for space reclamation as shown in GUI 800 of FIG. 8. Additionally, GUI 900 shows a window 905 which may be generated when the storage subsystem generates an alert in response to a given volume reaching a threshold amount of reclaimable storage capacity. In one embodiment, the threshold may be 20 GB, while in other embodiments, the threshold may be higher or lower than 20 GB.

In response to the volume "VMFS-5" (or "LUN 6" from the storage subsystem perspective) reaching a threshold amount of space which is available to be reclaimed, the storage subsystem may be configured to generate window 905 in the GUI 900. In various embodiments, window 905 may include a plurality of graphical control elements to allow the user to initiate one or more actions in response to the alert. For example, in one embodiment, the storage subsystem may be configured to generate graphical control element 910 to allow the user to launch a space reclamation script for the volume "VMFS-5". In one embodiment, the storage subsystem may be configured to create and then execute the space reclamation script in response to detecting the user selecting graphical control element 910. In another embodiment, a space reclamation script may already exist, and the storage subsystem may be configured to modify the script so that the script targets one or more specific volumes associated with the alert.

The storage subsystem may also be configured to generate graphical control element 915 to allow the user to wait to reclaim the space for the volume "VMFS-5" until the next scheduled maintenance window. The storage subsystem may also be configured to generate graphical control element 920 to allow the user to ignore the alert. It is noted that in other embodiments, GUI 900, window 905, and graphical control elements 910, 915, and 920 may appear differently and/or may include additional information. For example, although window 905 is shown as being displayed in a separate window in front of GUI 900, in other embodiments, the information shown in window 905 may be displayed within GUI 900. Also, other numbers of graphical control elements may be generated in other embodiments.

Figure 10:
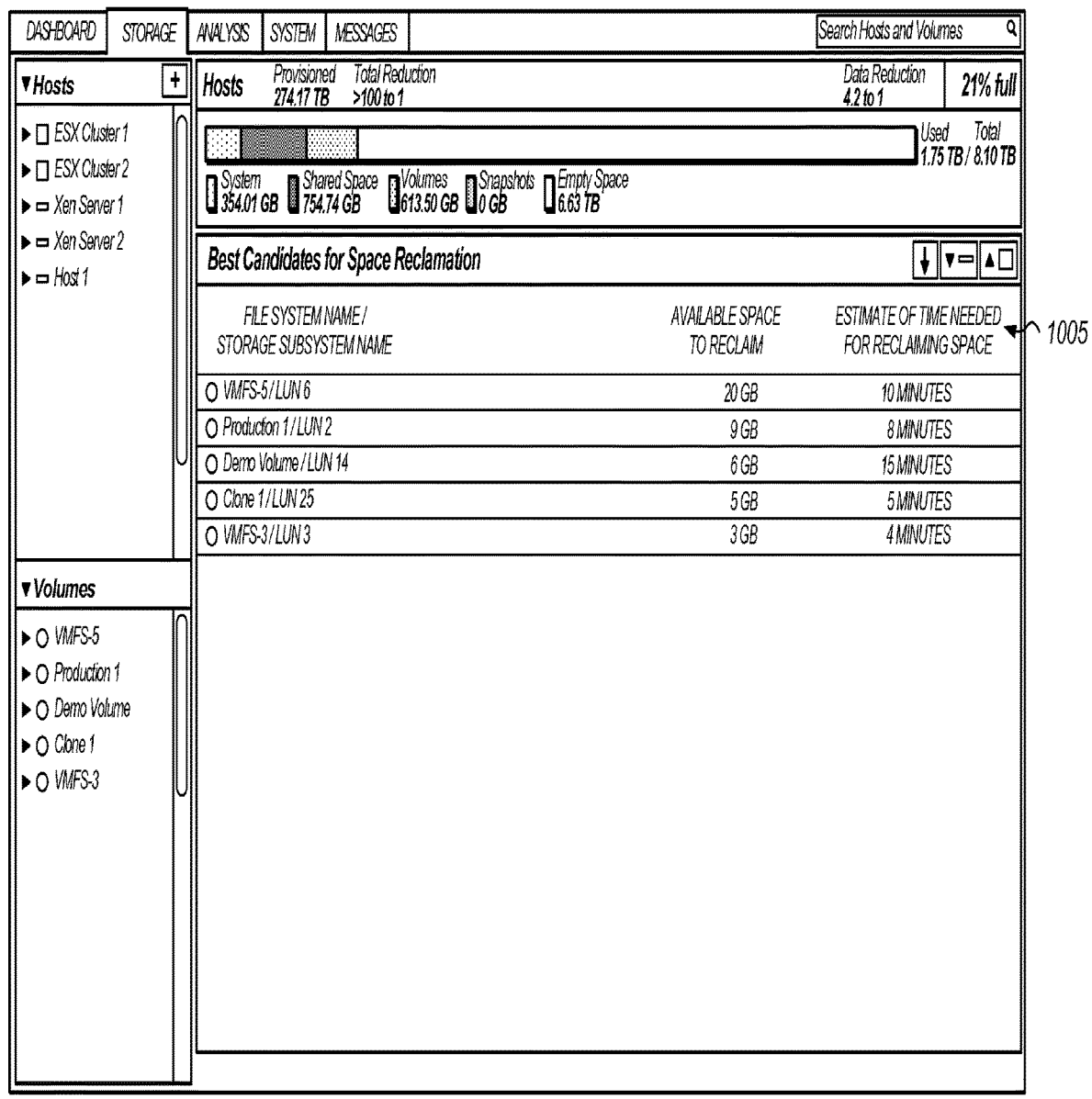
FIG. 10 illustrates another embodiment of a storage subsystem status GUI.

Turning now to FIG. 10, another embodiment of a storage subsystem status GUI 1000 is shown. GUI 1000 may show a list of volumes and other datasets which are the best candidates for performing space reclamation. GUI 1000 may also include various details associated with the best candidate datasets, including an amount of space to reclaim and an estimate for how long it will take to reclaim the available space in the dataset.

In one embodiment, the estimate 1005 for each dataset may be calculated independently by the storage subsystem without any input from the corresponding host. In another embodiment, the estimate 1005 for each dataset may be calculated using inputs from both the storage subsystem and the corresponding host. The estimate 1005 for each dataset may be calculated based on the file system type, the amount of capacity to be reclaimed, the status of the target storage devices, and/or one or more other factors.

Figure 11:
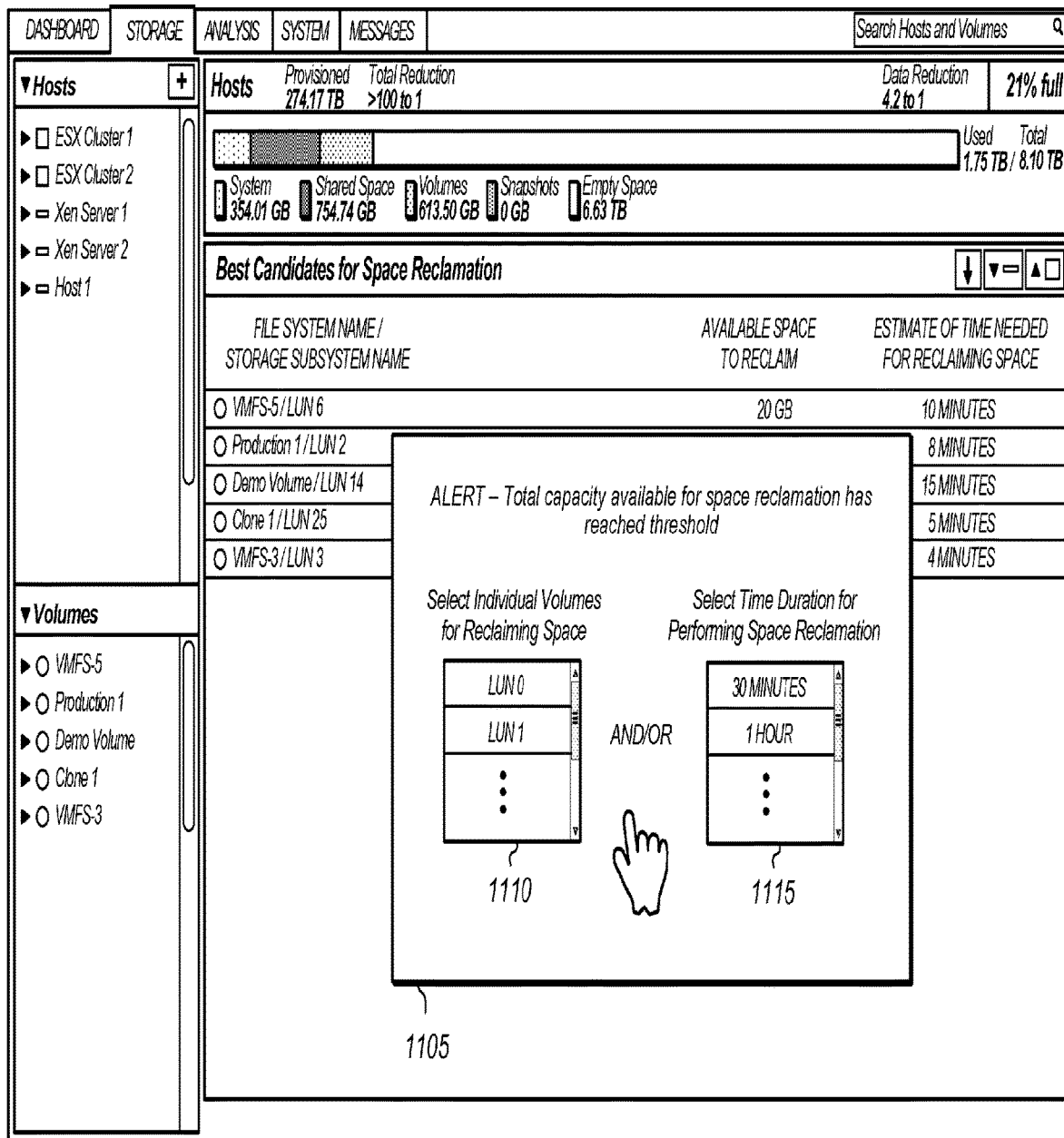
FIG. 11 illustrates another embodiment of a storage subsystem status GUI.

Referring now to FIG. 11, another embodiment of a storage subsystem status GUI 1100 is shown. In one embodiment, the storage subsystem may be configured to generate window 1105 to enable the user to select individual volumes for performing space reclamation and/or select an amount of time for performing space reclamation. The user may select individual volumes to perform space reclamation on, using box 1110. The user may select multiple volumes at the same time. Alternatively, the user may specify that the storage subsystem should select which volumes to perform space reclamation on based on the amount of time selected (in graphical control element 1115) for performing space reclamation. Although not shown in graphical control element 1115, the user may also specify a specific day and time when the space reclamation should occur.

In one embodiment, the storage subsystem may be configured to select which volumes to perform space reclamation on based on the amount of time selected by the user in graphical control element 1115. In another embodiment, the user may select one or more volumes for performing space reclamation and an amount of time for performing space reclamation. The storage subsystem may be configured to generate a warning for the user if the storage subsystem predicts that space reclamation on the one or more selected volumes will not be able to be completed in the amount of time selected by the user.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    detecting, by a storage controller of a storage system, a discrepancy between a first storage capacity of a dataset on the storage system and a second storage capacity of the dataset according to a file system of an external host system;
    in response to detecting the discrepancy between the first storage capacity of the dataset on the storage system and the second storage capacity of the dataset according to the file system of the external host system, identifying, by the storage controller, one or more blocks to reclaim of the dataset that are no longer in use; and
    in response to detecting the discrepancy, generating, by the storage controller of the storage system, a request to the file system of the external host system to reclaim the one or more blocks of storage capacity for the dataset that are no longer in use.

2. The method of claim 1, wherein identifying the blocks of the dataset that are no longer in use includes obtaining, from a system associated with the dataset, the identity of the blocks of the dataset that are no longer in use.

3. The method of claim 1, further comprising freeing the one or more identified blocks by removing references from the dataset to the identified blocks.

4. The method of claim 1, further comprising freeing the one or more identified blocks by issuing small computer system interface (SCSI) UNMAP commands to the storage system.

5. The method of claim 1, wherein the identified blocks are freed as part of a garbage collection operation.

6. The method of claim 1, wherein freeing the one or more identified blocks to reclaim storage capacity for the dataset includes:
    issuing, by the storage controller, a command to the storage system to free the identified blocks.

7. The method of claim 1,
    wherein the dataset is managed by a first file system,
    wherein identifying, by the storage controller, the one or more blocks to reclaim of the dataset that are no longer in use comprises identifying, by the storage controller, one or more blocks to reclaim of an additional dataset that are no longer in use, wherein the additional dataset is managed by a second file system, and
    wherein freeing, in response to a determined amount of reclaimable storage capacity meeting at least a threshold amount of reclaimable space, the one or more identified blocks to reclaim storage capacity for the dataset comprises selecting to reclaim storage capacity for the dataset over reclaiming storage capacity for the additional dataset based on the second file system managing the additional data set.

8. An apparatus comprising a computer processor and a computer readable storage medium, wherein the computer readable storage medium includes computer program instructions that when executed by the computer processor cause the apparatus to carry out the steps of:
    detecting, by a storage controller of a storage system, a discrepancy between a first storage capacity of a dataset on the storage system and a second storage capacity of the dataset according to a file system of an external host system;
    in response to detecting the discrepancy between the first storage capacity of the dataset on the storage system and the second storage capacity of the dataset according to the file system of the external host system, identifying, by the storage controller, one or more blocks to reclaim of the dataset that are no longer in use; and
    in response to detecting the discrepancy, generating, by the storage controller of the storage system, a request to the file system of the external host system to reclaim the one or more blocks of storage capacity for the dataset that are no longer in use.

9. The apparatus of claim 8 wherein identifying which blocks of the dataset are no longer in use includes obtaining, from the system associated with the dataset, the identity of the blocks of the dataset that are no longer in use.

10. The apparatus of claim 8, further comprising freeing the one or more identified blocks by removing references from the dataset to the identified blocks.

11. The apparatus of claim 8, further comprising freeing the one or more identified blocks by issuing small computer system interface (SCSI) UNMAP commands to the storage system.

12. The apparatus of claim 8 wherein the identified blocks are freed as part of a garbage collection operation.

13. The apparatus of claim 6, wherein freeing the one or more identified blocks to reclaim storage capacity for the dataset includes:
    issuing, by the storage controller, a command to the storage system to free the identified blocks.

14. A non-transitory computer readable storage medium, the computer readable storage medium including computer program instructions that when executed by a computer cause the computer to carry out the steps of:

detecting, by a storage controller of a storage system, a discrepancy between a first storage capacity of a dataset on the storage system and a second storage capacity of the dataset according to a file system of an external host system;

in response to detecting the discrepancy between the first storage capacity of the dataset on the storage system and the second storage capacity of the dataset according to the file system of the external host system, identifying, by the storage controller, one or more blocks to reclaim of the dataset that are no longer in use; and in response to detecting the discrepancy, generating, by the storage controller of the storage system, a request to the file system of the external host system to reclaim the one or more blocks of storage capacity for the dataset that are no longer in use.

15. The non-transitory computer readable storage medium of claim 14, wherein identifying blocks of the dataset that are no longer in use includes obtaining, from the system associated with the dataset, the identity of the blocks of the dataset that are no longer in use.

16. The non-transitory computer readable storage medium of claim 14, further comprising freeing the one or more identified blocks by removing references from the first dataset to the identified blocks.

17. The non-transitory computer readable storage medium of claim 14, further comprising freeing the one or more identified blocks by issuing small computer system interface (SCSI) UNMAP commands to the storage system.

18. The non-transitory computer readable storage medium of claim 14, wherein freeing the one or more identified blocks to reclaim storage capacity for the dataset includes:

issuing, by the storage controller, a command to the storage system to free the identified blocks.

\* \* \* \* \*